(12) United States Patent
Sankar et al.

(10) Patent No.: US 10,750,553 B2
(45) Date of Patent: Aug. 18, 2020

(54) SYSTEMS AND METHODS FOR SELECTION OF COLLOCATED NODES IN 5G NETWORK

(71) Applicant: Cisco Technology, Inc., San Jose, CA (US)

(72) Inventors: Mantha Ravi Sankar, Bangalore (IN); Sandeep Dasgupta, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/140,712

(22) Filed: Sep. 25, 2018

(65) Prior Publication Data
US 2020/0100303 A1    Mar. 26, 2020

(51) Int. Cl.
*H04W 76/11*  (2018.01)
*H04W 36/00*  (2009.01)
*H04L 29/12*  (2006.01)
*H04W 36/22*  (2009.01)

(52) U.S. Cl.
CPC ......... *H04W 76/11* (2018.02); *H04L 61/1511* (2013.01); *H04W 36/0022* (2013.01); *H04W 36/22* (2013.01)

(58) Field of Classification Search
CPC .............. H04W 76/11; H04W 36/0022; H04L 61/1511
See application file for complete search history.

(56) References Cited

U.S. PATENT DOCUMENTS

| 9,973,966 | B2 | 5/2018 | Karampatsis et al. |
| 2017/0332421 | A1 | 11/2017 | Sternberg et al. |
| 2018/0103363 | A1 | 4/2018 | Faccin et al. |
| 2018/0199243 | A1 | 7/2018 | Bharatia |
| 2018/0317086 | A1 | 11/2018 | Ben Henda et al. |
| 2018/0367980 | A1* | 12/2018 | Lee .......... H04W 8/08 |
| 2019/0059067 | A1* | 2/2019 | Lee .......... H04W 60/04 |
| 2019/0075606 | A1* | 3/2019 | Myhre ........ H04L 45/64 |
| 2019/0098536 | A1* | 3/2019 | Qiao ......... H04W 36/0016 |
| 2019/0116631 | A1* | 4/2019 | Talebi Fard ........ H04W 80/10 |

(Continued)

FOREIGN PATENT DOCUMENTS

WO    2018008983 A1    1/2018

OTHER PUBLICATIONS

International Search Report and Written Opinion in counterpart International Application No. PCT/US2019/052333, dated Nov. 28, 2019, 17 pages.

(Continued)

*Primary Examiner* — Gary Mui

(57) ABSTRACT

A disclosed method is performed at a first node providing mobile services to a user equipment (UE) over an access network (AN). The first node receives a setup request from UE to be connected to a network over an AN. The first node then sends a fully qualified domain name (FQDN) of the first node over a first interface terminated by the first node to an access and mobility management function (AMF). The first node further triggers the AMF to transmit a session establishment request to a session management function (SMF) including the FQDN of the first node, where in response, the SMF selects second node(s) in the network collocated with the first node based at least in part on a topology match of FQDNs. The first node then provides UE access to the network over the AN through the collocated first node and the node(s).

20 Claims, 9 Drawing Sheets

(56) References Cited

U.S. PATENT DOCUMENTS

| | | | |
|---|---|---|---|
| 2019/0182875 A1* | 6/2019 | Talebi Fard | H04W 76/11 |
| 2019/0239133 A1* | 8/2019 | Yu | H04W 36/0033 |
| 2019/0261260 A1* | 8/2019 | Dao | H04W 36/0009 |
| 2019/0313468 A1* | 10/2019 | Talebi Fard | H04W 40/246 |
| 2019/0313479 A1* | 10/2019 | Myhre | H04W 80/12 |

OTHER PUBLICATIONS

3GPP, "3rd Generation Partnership Project; Technical Specification Group Services and System Aspects; System Architecture for the 5G System; Stage 2 (Release 15)", 3GPP TS 23.501 V15.2.0, Jun. 2018, 217 pages.

3GPP, 3rd Generation Partnership Project; Technical Specification Group Services and System Aspects; Procedures for the 5G System; Stage 2 (Release 15), 3GPP TS 23.502 V15.3.0, Sep. 2018, 330 pages.

Ericsson, "Editorial Corrections and Alignment", Ericcson (Rapporteur), Nov. 27, 2017-Dec. 1, 2017, pp. 1-196.

3GPP Organizational Partners, "3rd Generation Partnership Project; Technical Specification Group Services and System Aspects; System Architecture for the 5G System; Stage 2 (Release 15)", 3GPP TS 23.501 V15.3.0, Sep. 2018, 226 pages.

3GPP Organizational Partners, "3rd Generation Partnership Project; Technical Specification Group Radio Access Network; NG-RAN; NG Application Protocol (NGAP) (Release 15)", 3GPP TS 38.413 V15.0.0, Jun. 2018, 264 pages.

Satish Kanugovi, NOKIA, "WiFi Integration in Evolution to 5G networks", Mar. 9, 2018, 15 pages.

Cisco, "Cisco Ultra 5G Packet Core Solution", C11-740360-00, Feb. 2018, 11 pages.

Namseok Ko, "Development Status of 5G Core Network in ETRI", Nov. 15, 2017, 25 pages.

ZTE Technologies, "Special Topic: 5G Core", vol. 20, No. 6, Issue 179, Dec. 2018, 44 pages.

Huawei et al., "PDU session management procedure", SA WG2 Meeting #119, S2-170977, Feb. 13-17, 2017, 10 pages.

Samsung, "4G-5G Interworking", RAN-level and CN-level Interworking, Jun. 2017, 17 pages.

* cited by examiner

SYSTEMS AND METHODS FOR SELECTION OF COLLOCATED NODES IN 5G NETWORK

TECHNICAL FIELD

The present disclosure relates generally to computer networks, and more particularly, to systems and methods for selecting collocated nodes in 5G network.

BACKGROUND

Fifth Generation (5G) (also referred to as Next Generation (NG)) architecture introduces a mix of heterogenous services. For example, a User Equipment (UE) with one interface for Third Generation Partnership Project (3GPP) access (e.g., Long-Term Evolution (LTE) etc.) can be connected to a 5G network through a 3GPP access network (AN) and another interface for non-3GPP access (e.g., WiFi) can also be connected to the 5G network through a non-3GPP AN. When the UE connects to the 5G network over a non-3GPP AN, there are several hops in the data path before UE can reach a data network (DN). Each hop along the data path introduces latency, thereby degrading performance.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1A:
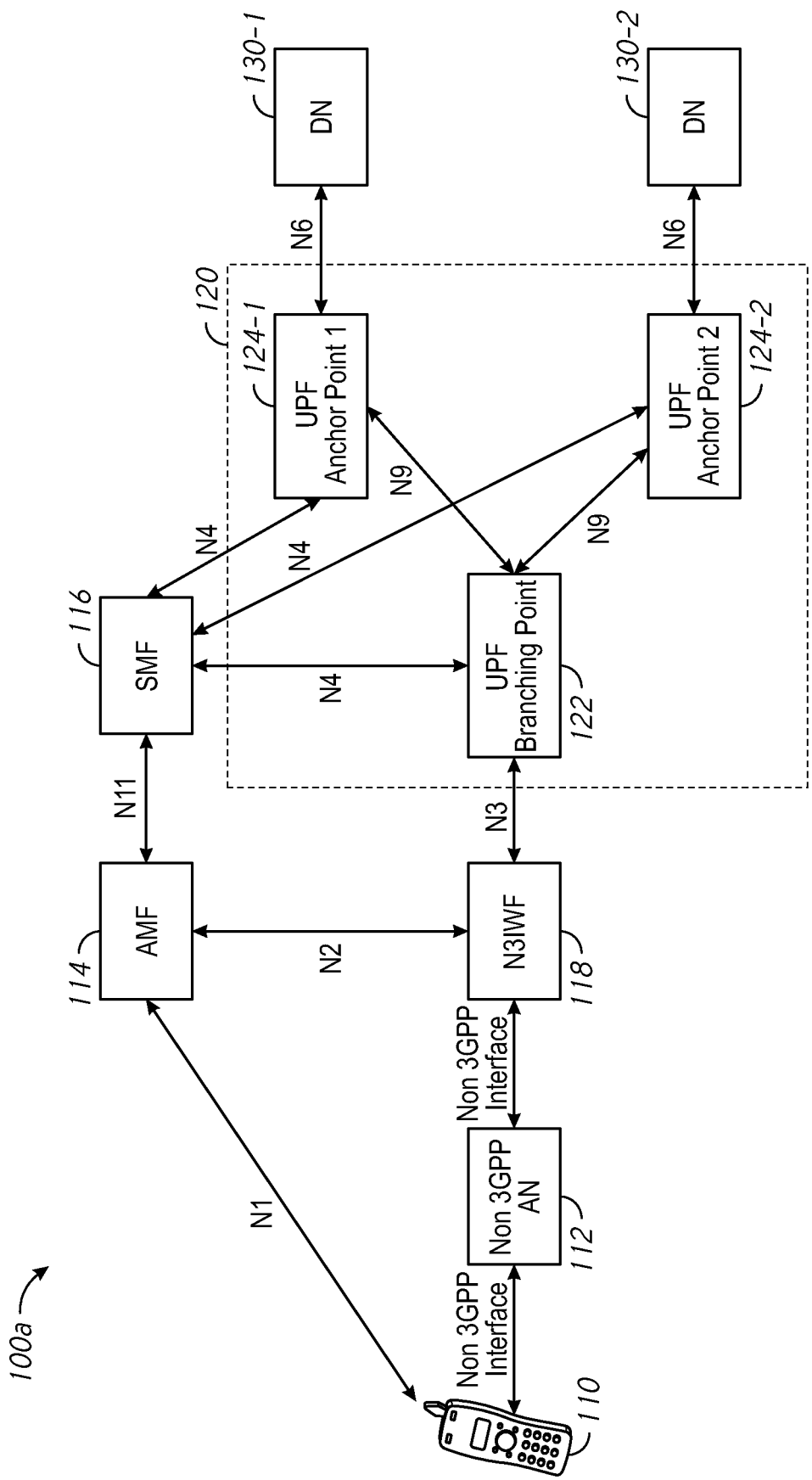
FIGS. 1A-1C are illustrations of examples of 5G networks, where for a single protocol data unit (PDU) session, more than one user plane functions (UPFs) are present in accordance with some implementations.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Overview

Systems and methods of the present disclosure solve the aforementioned problems in 5G networks. In current 5G core networks, N3 InterWorking Function (N3IWF) is a non-3GPP access terminating node and provides 5G services to user equipment (UE) over an untrusted non-3GPP access network (AN). N3IWF typically terminates N2 interface towards Access and Mobility Management Function (AMF) and terminates N3 interface towards User Plane Function (UPF). When a UE connects to a 5G core network over a non-3GPP AN, there are several hops in the data path between UE and a data network (DN). For example, between hops there can be routes from non-3GPP AN to N3IWF and from N3IWF to UPF UL/DL classifier or UPF Branch Point. In addition, when there are multiple UPFs, the data paths can also include hop(s) from one UPF to another.

Some 3GPP systems include mechanisms enabling collocation of user plane functions (UPFs). For example, 3GPP acknowledges collocating UPF uplink/downlink (UL/DL) classifier or Branch Point UPF with Protocol Data Unit (PDU) session anchor UPF. However, collocation of N3IWF with UPFs does not exist in previously existing systems and methods. Further, assuming collocated N3IWF and UPFs, 5G core networks lack a mechanism to select such collocated nodes in order to benefit from the reduced hops along the data path. Additionally, previously existing systems and methods do not provide mechanisms to choose a UPF that is collocated with a N3IWF.

By contrast, various systems and methods disclosed herein reduce latency and improve performance by collocating N3IWF and UPFs. Further, the types of collocation described herein enable the Session Management Function (SMF) to select the collocated UPF. For example, UEs with both 3GPP and non-3GPP subscriptions or mobile edge computing devices can benefit from the collocated N3IWF and UPF. Accordingly, from a pool including both collocated UPFs and standalone UPFs, collocated UPFs are selected in order to service such UEs. In another example, fixed wireless access UE sessions can be serviced by a standalone UPF without going through the data path involving N3IWF. Accordingly, from the pool of UPFs, the standalone UPFs are selected in order to service the fixed wireless access UE sessions.

In some implementations, a method is performed at a first node providing mobile services to a user equipment (UE) over an access network, where the first node terminates a first interface towards an access and mobility management function (AMF). The first node receives a setup request from UE to be connected to a network over the access network. The first node sends a fully qualified domain name (FQDN) of the first node over the first interface to the AMF in response to the setup request. The first node further triggers the AMF to transmit a session establishment request to a session management function (SMF), wherein the session establishment request includes the FQDN of the first node, and in response to receiving the session establishment request, the SMF selects one or more second nodes in the network collocated with the first node based at least in part on a topology match of the FQDN of the first node and one or more FQDNs of the one or more second nodes. The first node provides UE access to the network over the access network through the collocated first node and the one or more second nodes.

EXAMPLE EMBODIMENTS

Referring to FIG. 1A, an illustration of a 5G networking environment 100A, where for a single protocol data unit (PDU) session, more than one UPFs are present in a data path in accordance with some implementations. Typically, a UE receives services through the PDU session, which is a logical connection between UE and a DN. In 5G networking environments (hereinafter sometimes "5G"), various PDU session types are supported, such as IPv4, IPv6, Ethernet, etc. 5G supports a UE establishing multiple PDU sessions to the same DN or to different DNs over a single AN or multiple ANs, including 3GPP and non-3GPP accesses.

In FIG. 1A, UE 110 (e.g., a mobile phone) in the 5G network 100A via a non-3GPP AN 112, e.g., a Wi-Fi access point, in order to connect and exchange data with one or more DNs 130. The one or more DNs 130 provide Internet access and/or operator services. The 5G network 100A includes a plurality of network functions and reference points (also known as interfaces) connecting the network functions to facilitate communications (e.g., connectivity) between UE 110 and the one or more DNs 130.

The network functions can include AMF 114, SMF 116, N3IWF 118, and user plane function (UPF) 120, and/or the like. Though not shown in FIG. 1A, in some implementations, the network functions of the 5G network 100A can include other functions such as Policy Control Function (PCF), Application Function (AF), Authentication Server Function (AUSF), and User Data Management (UDM), and/or the like. Among these functions, AMF 114 serves multiple purposes and is connected to UE 110 through interface N1. For example, AMF 114 manages device authentication and authorization, provides security and integrity protection, and tracks UE registration in the operator's network and mobility management functions as the UE 110 moves among different access networks, and/or the like. Each of the different access networks may be using different radio access technologies. SMF 116 handles IP anchor point selection and addressing functionality, manages user plane state in UPFs during PDU session establishment, modifies/terminates/interacts with AN to allow PDU session forwarding in uplink/downlink (UL/DL) to a respective DN, and/or the like. N3IWF is a non-3GPP access terminating node and provides 5G services to UE 110 over the untrusted non-3GPP AN 112.

The interfaces can include, for instance, N1, N2, N3, N4, N6, N9, and N11, among others. As described in relevant (evolving) standards documents, these interfaces define the communications and/or protocols between various functions. For instance, N1 is defined to carry signaling between UE 110 and AMF 114. The interfaces for connecting between N3IWF 118 and AMF 114 and between N3IWF 118 and UPF 120 are defined as N2 and N3, respectively. There is no interface between N3IWF 118 and SMF 116, but there is one interface N11, between AMF 114 and SMF 116. Through N11, SMF 116 is controlled by AMF 114. N4 is used by SMF and UPF(s) 120, so that SMF 116 can generate control signals to set UPF(s) 120, and UPF(s) 120 can report state(s) to SMF 116. N9 is the interfaces for connection(s) between different UPFs 120. N6 is the reference point for connecting a respective UPF 120 with a respective DN 130. For example, one N6 connects UPF anchor point 1 124-1 with DN 1 130-1, and another N6 connects UPF anchor point 2 124-2 with DN 2 130-2.

A feature of 5G is separating user plane and control plane. The user plane carries user traffic, whereas the control plane carries control signaling in the network. In FIG. 1A, UPF 120 is in the user plane; whereas other network functions, such as AMF 114, SMF 116, N3IWF 118, etc., are in the control plane. Separating the user and control planes enables each plane resource to be scaled independently. It also enables one or more UPFs to be deployed separately from control plane functions in a distributed fashion. UPF is the generalized logical data plane function corresponding to a UE PDU session. In some implementations, multiple UPFs are deployed so that each UPF can serve a different role, such as: being an uplink flow classifier (UL-CL); being a PDU session anchor point; serving branching point function; etc.

For example, in FIG. 1A, UPF 120 includes UPF branching point 122 and more than one UPF anchor point 124 for multihoming towards DN 130. Along the data path in uplink direction from UE 110 to the DN 130, the UPF branching point 122 splits the data traffic towards UPF anchor point 1 124-1 and UPF anchor point 2 124-2, and the respective anchor point 124 then forwards the data to the respective DN 130. Along the data path in downlink direction from the DN 130 to UE 110, UPF branching point 122 aggregates the downlink traffic from multiple UPF anchor points 124 before forwarding the aggregated downlink traffic to N3IWF 188 over N3.

Figure 1B:
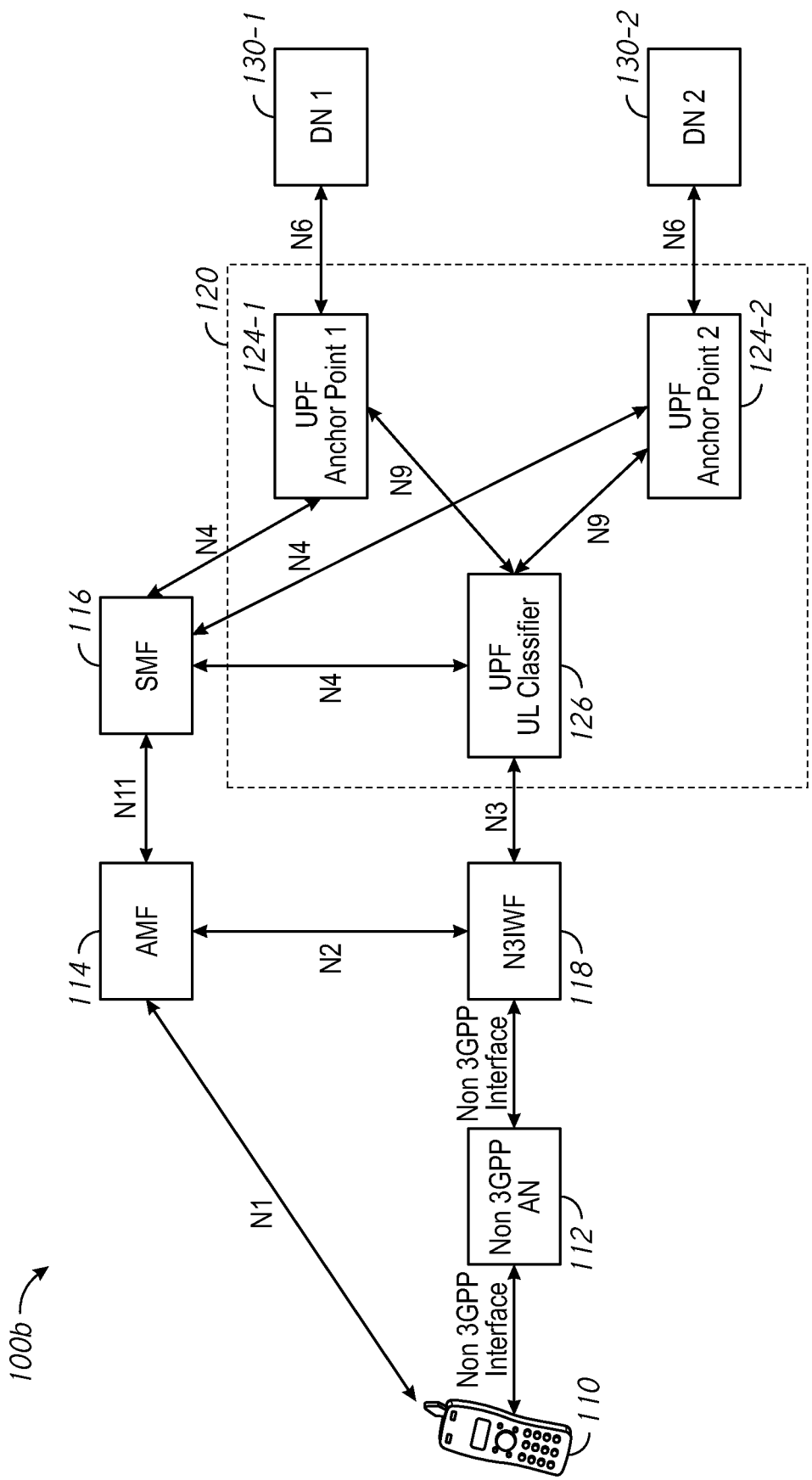

Turning to FIG. 1B, an illustration of another 5G network 100B, where for a single PDU session, more than one UPFs are present in a data path in accordance with some implementations. In some implementations, the network 100B illustrated in FIG. 1B is similar to and adapted from the network 100A illustrated in FIG. 1A. Accordingly, elements common to FIGS. 1A and 1B include common reference numbers, and the differences between FIGS. 1A and 1B are described herein for the sake of brevity.

In network 100B, a UPF designated as UL Classifier 126 interacts with two or more UPF anchor points, including UPF anchor point 1 124-1 and UPF anchor point 2 124-2. UPF UL Classifier 126 diverts traffic to a respective UPF Anchor Point 124 by matching filters or classification rules provided by SMF 116. For instance, based on the classification rules provided by SMF 116, UPF UL Classifier 126 determines how packets can be routed by examining a destination IP address of packets sent by UE 110. As a result, UE 110 uses the same IP address to access either DN 130-1 or DN 130-2 without knowing with which DN 130 it is communicating.

In both the networks 100A and 100B shown in FIGS. 1A and 1B, between the UE 110 connected to the 5G network and the data network 130, there are several hops in the data path. For example, starting from non-3GPP AN 112, a first hop is from non-3GPP AN 112 to N3IWF; a second hop is from N3IWF 118 to UPF branching point 122 (FIG. 1A) or UPF UL/DL classifier 126 (FIG. 1B); and a third hop is from UPF branching point 122 (FIG. 1A) or UPF UL/DL classifier 126 (FIG. 1B) to a respective anchor point 124. Each hop along the data path introduces latency and/or delay. Accordingly, it is advantageous to collocate functions in order to reduce the number of hops.

Figure 1C:
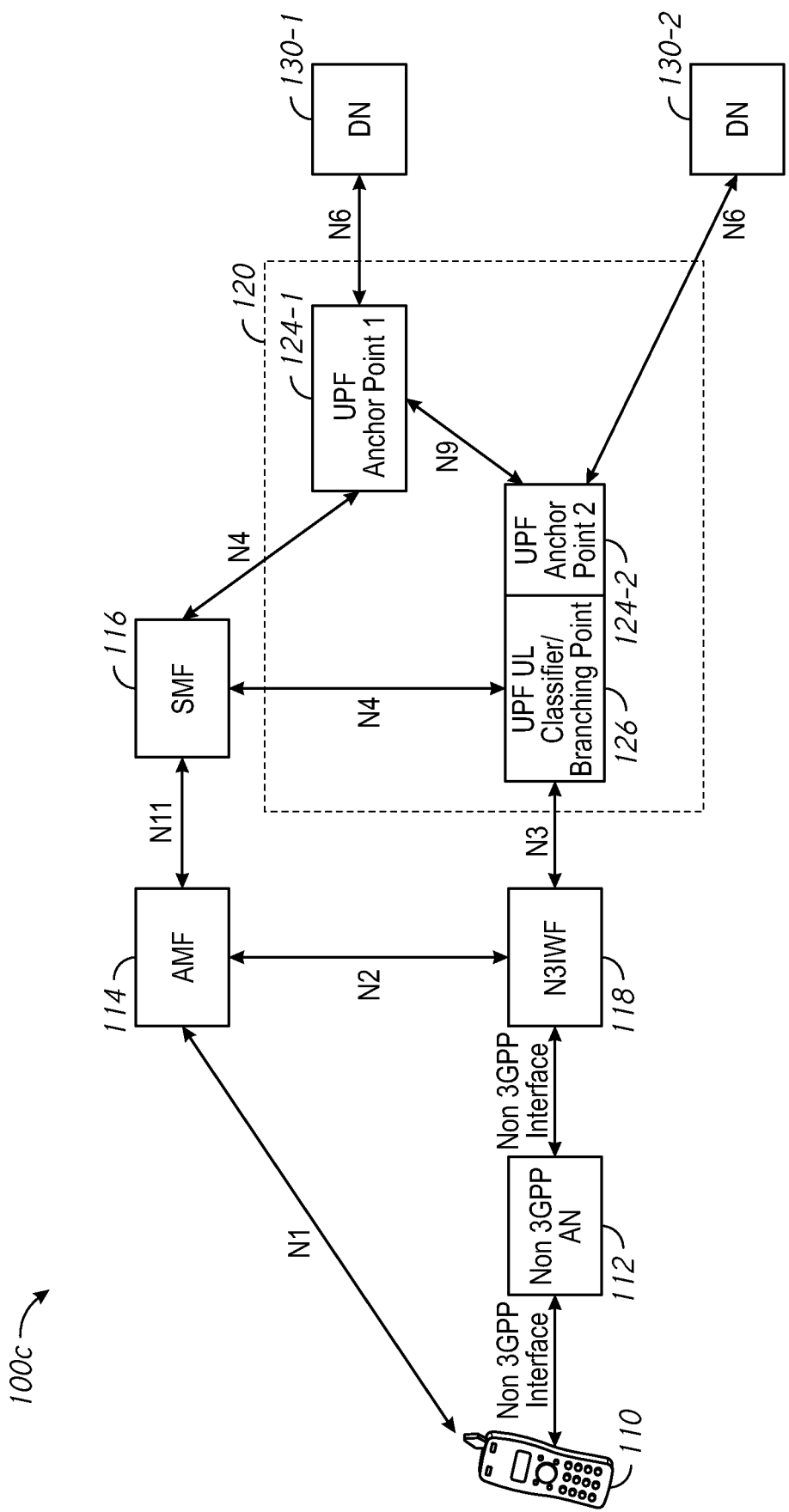

In both the above cases, UPF Branching Point 122 (FIG. 1A) or UPF UL Classifier 126 (FIG. 1B) communicates with N3IWF 118 over N3 interface. In order to achieve efficient data transfer with low latency and high throughput, 3GPP specifies that UPF Branching Point 122 (FIG. 1A) and/or UPF UL Classifier 126 (FIG. 1B) can be collocated with a respective Anchor Point UPF, as shown in FIG. 1C. In the network 100C shown in FIG. 1C, during UPF selection, SMF 116 can select these collocated UPFs 126 and 124-2 in order to reduce latency along the data path. However, further performance gains can be realized if N3IWF in the control plane and UPF Branching Point/UPF UL Classifier in the user plane are also collocated.

Figure 2:
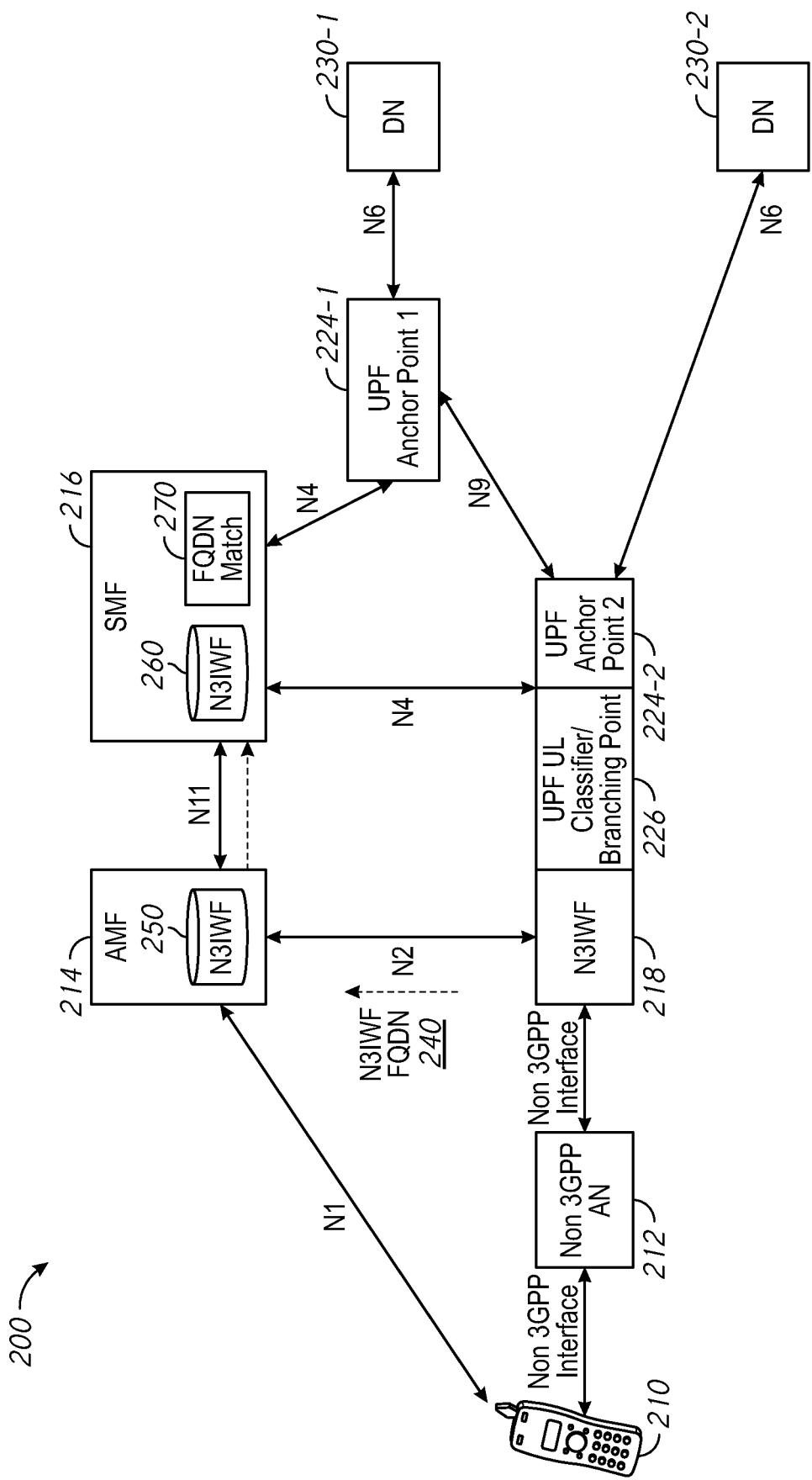
FIG. 2 is an illustration of an exemplary 5G network with N3 InterWorking Function (N3IWF) collocated with UPFs in accordance with some implementations.

FIG. 2 is an illustration of a 5G network 200, where N3IWF and UPFs are collocated and the collocated N3IWF and UPFs are selected to serve a PDU session in accordance with some implementations. In the 5G network 200, UE 210 is connected to the 5G network 200 via a non-3GPP AN 212, e.g., a Wi-Fi access point, in order to connect and exchange data with a data network (DN) 230. The DN 230 provides Internet access and/or operator services.

The 5G network 200 includes a plurality of network functions and reference points facilitating the network functions. The network functions include AMF 214, SMF 216, N3IWF 218, UPF branching point and/or branching point 226 and a plurality of UPF anchor points, e.g., UPF anchor point 1 224-1 and UPF anchor point 2 224-2. The reference points (or the interfaces) include, for instance, N1, N2, N4, N6, N9, and N11, among others.

Similar to the reference points in FIGS. 1A-1C, in the 5G network 200, N1 is defined to carry signaling between UE 210 and AMF 214. The interface for connecting between N3IWF 218 and AMF 214 is defined as N2. There is no interface between N3IWF 218 and SMF 216, but there is one interface N11, between AMF 214 and SMF 216. Through N11, SMF 216 is controlled by AMF 214. N4 is used by SMF and UPFs 226 and 224-2, so that UPFs 226 and 224-2 can be set using the control signal generated by SMF 216, and UPFs 226 and 224-2 can report state(s) to SMF 216. N9 is the interface for connection between UPF Anchor Points 224. N6 is the reference point for connecting a respective UPF Anchor Point 224 with a respective DN 230. For example, one N6 connects UPF anchor point 1224-1 with DN 1230-1, and another N6 connects UPF anchor point 2 224-2 with DN 2 230-2.

In some implementations, the UPFs, e.g., UPF UL Classifier/branching point 226 and UPF anchor point 2 224-2 are collocated according to 3GPP as shown in FIG. 1C and described above. Relative to the 5G network 100C in FIG. 1C, UPF UL Classifier/branching point 226 and UPF anchor point 2 224-2 are further collocated with N3IWF 218 in the network 200 shown in FIG. 2. As a result, the reference point N3 in FIG. 1C between N3IWF 118 and the collocated UPFs 126 and 124-1 is not present in the 5G network 200. Accordingly, relative to the network 100C, the number of hops along the data path in the network 200 is further reduced and the performance of the 5G network 200 is improved.

In order to select the collocated N3IWF 218 and UPFs 226 and 224-2, N3IWF 218 publishes its fully qualified domain name (FQDN) to AMF 214 during NextGen (NG) set up procedure over N2 interface. AMF 214 then stores N3IWF FQDN in a data repository 250 in some implementations. Additionally, AMF forwards N3IWF FQDN to SMF 216 over N11 interface during a PDU setup procedure. In some implementations, SMF 216 stores N3IWF FQDN in a data repository 260 and uses N3IWF FQDN during UPF selection. In some implementations, a FQDN match module 270 on SMF 216 selects a UPF that is collocated with N3IWF 218 by performing a topology based matching of N3IWF FQDN and UPF FQDNs. The topology based matching is further described below with reference to FIG. 3. Using the collocated N3IWF 218 and UPFs 226 and 224-2, relative to the networks 100A-100C shown in FIGS. 1A-1C, the network 200 reduces the number of hops along the data path from UE 210 to DN 230. As a result, the network 200 has higher throughput and lower latency.

Figure 3:
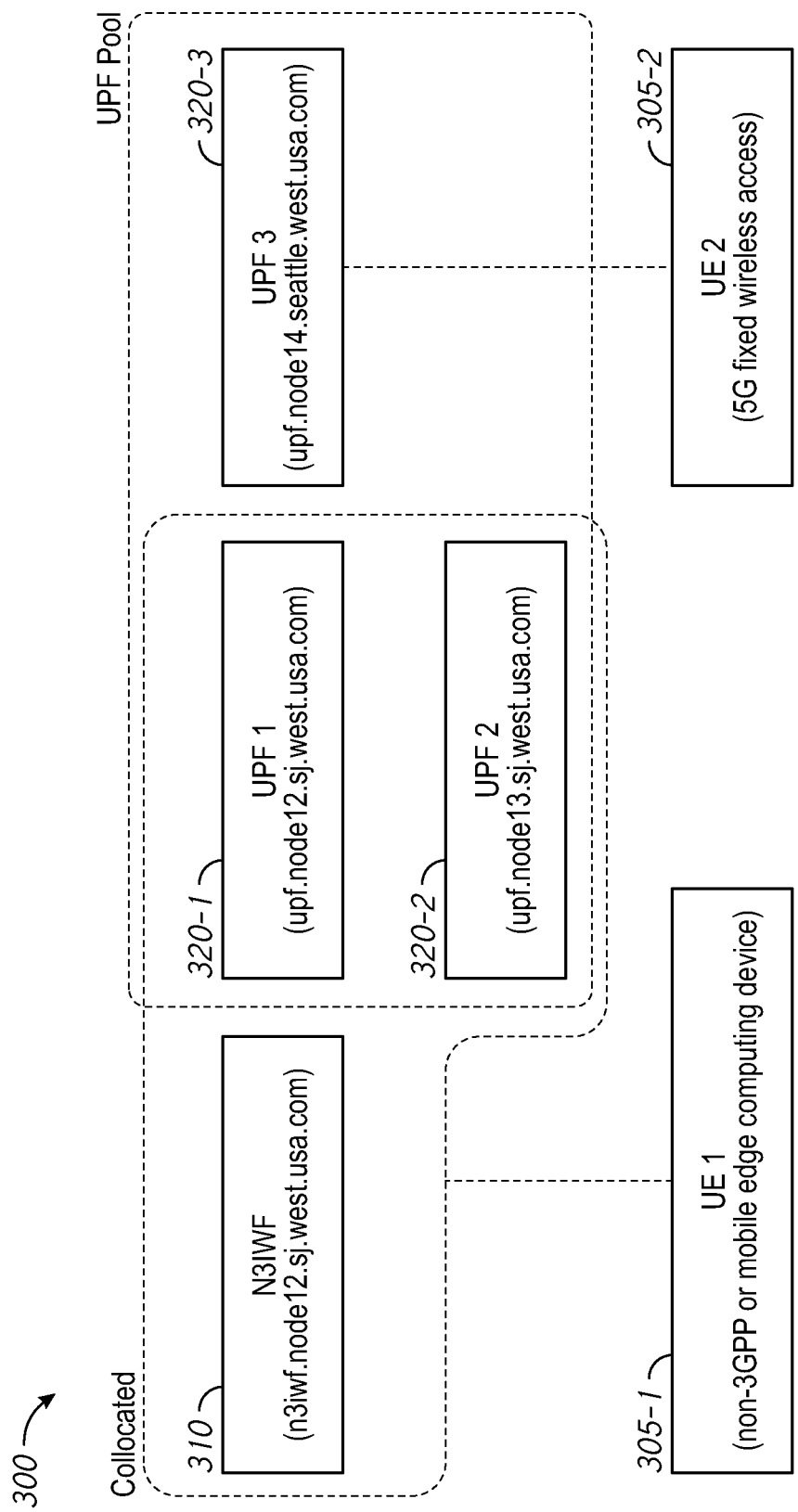
FIG. 3 is an illustration of a UPF selection in a 5G network in accordance with some implementations.

FIG. 3 illustrates node selection in a 5G network 300 in accordance with some implementations. In some implementations, the node selection is performed by SMF (e.g., the FQDN match module 270 of SMF 216 in FIG. 2). In some implementations, the 5G network 300 includes N3IWF node 310 and a pool of UPF nodes, e.g., UPF 1 320-1, UPF 2 320-2, UPF 3 320-3 etc. N3IWF node 310 is associated with a FQDN, e.g., n3iwf.node12.sj.west.usa.com. Each of the UPF nodes 320 is also associated with a FQDN. For instance, the FQDN for UPF 1 320-1 is upf.node12.sj.west.usa.com, the FQDN for UPF 2 320-2 is upf.node12.sj.west.usa.com, and the FQDN for UPF 3 320-3 is upf.node14.seattle.west.usa.com.

In some implementations, SMF selects collocated nodes by matching one or more portions the FQDN of N3IWF 310 with one or more portions of the FQDN of available UPFs 320 in the UPF pool. For example, by matching a portion of the FQDN of N3IWF 310 corresponding to subdomain "sj.west.usa.com" and a portion of the FQDN of UPF 1 320-1 corresponding to subdomain "sj.west.usa.com", SMF identifies UPF 1 320-1 as being collocated with N3IWF 310. Further, by matching a portion of the FQDN of N3IWF 310 corresponding to "sj.west.usa.com" and a portion of the FQDN of UPF 2 320-2 corresponding to "sj.west.usa.com", SMF identifies UPF 2 320-2 as being collocated with N3IWF 310.

In some implementations, when a UE (e.g., UE 2 305-2) reaches a data network through 5G fixed wireless access, SMF selects a standalone UPF servicing fixed wireless access UE sessions. For example, in FIG. 3, a portion of the FQDN of N3IWF 310 corresponding to "sj.west.usa.com" does not match a portion of the FQDN of UPF 3 320-3 corresponding to "seattle.west.usa.com," and SMF does not select UPF 3 320-3 as collocated node with N3IWF 310. Thus, UPF 3 320-3 is considered a standalone UPF. In order to service 5G fixed wireless access sessions from UE 2 305-2, SMF selects the standalone UPF 3 320-3. On the other hand, when UE 1 305-1 having a non-3GPP interface or being a mobile edge computing device connects to N3IWF 310 through a non-3GPP AN, SMF selects the collocated UPF 1 320-1 and UPF 2 320-2 from the UPF pool to service the sessions from UE 1 305-1.

It should be noted that though FIG. 3 illustrates selecting collocated N3IWF 310 with UPF 1 320-1 and UPF 2 320-2 by matching the third level domain name, e.g., the portions of FQDNs corresponding to "sj.west.usa.com," the topology matching can be performed at any level of the domain names. Further, though FIG. 3 illustrates collocating N3IWF 310 with two UPFs 320-1 and 320-2, N3IWF 310 can be collocated with more than or less than two UPFs. For example, by matching the fourth level domain names, e.g., the portions of FQDNs corresponding to "node12.sj.west.usa.com," SMF can select UPF 1 320-1 from the UPF pool to be collocated with N3IWF 310. In another example, by matching the second level domain names, e.g., the portions of FQDNs corresponding to "west.usa.com," SMF can select UPF 1 320-1, UPF 2 320-2, and UPF 3 320-3 from the UPF pool to be collocated with N3IWF 310.

Figure 4:
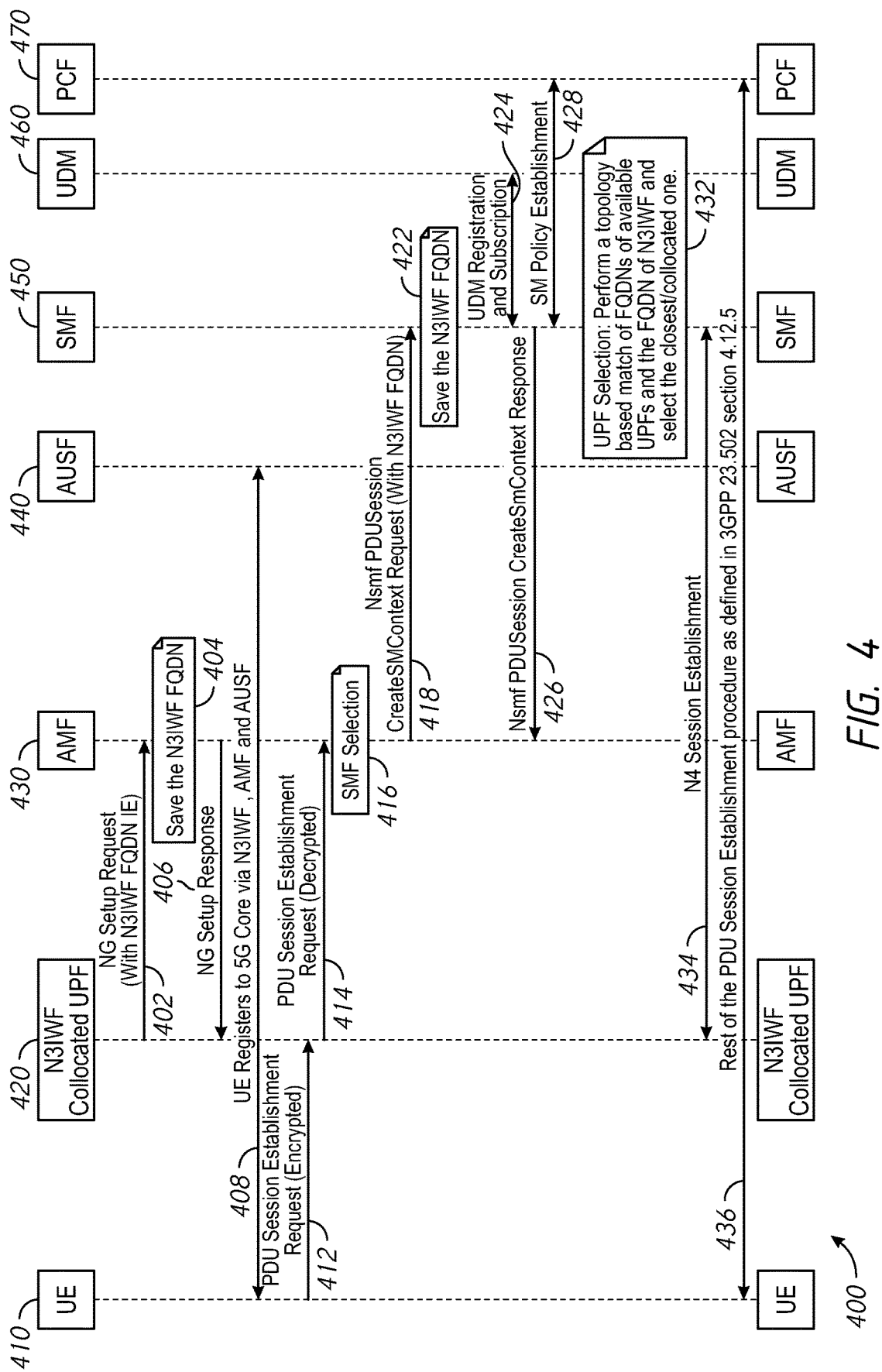
FIG. 4 is a process flow diagram illustrating a method of selecting collocated N3IWF and UPF in a PDU session establishment process in accordance with some implementations.

FIG. 4 is a process flow diagram 400 illustrating a method of selecting collocated N3IWF and UPF in a PDU session establish process in accordance with some implementations.

In some implementations, the process flow 400 is applied to a 5G mobile network (e.g., the 5G mobile network 200 of FIG. 2) in accordance with some implementations. In some implementations, the process flow 400 begins with UE 410 selecting N3IWF 420 based on tracking area according to methods described in 3GPP specification. N3IWF 420 then sends its FQDN over N2 to AMF 430 (step 402 of FIG. 4).

As defined in 3GPP specification, during step 402, N3IWF 420 sends a NG SETUP REQUEST message to AMF 430 in order to exchange application level data for 5G Radio Access Network (also known as NG-RAN) node and for AMF to correctly interoperate on 5G core interface. In addition, in some implementations, the NG SETUP REQUEST message includes an information element (IE) representing N3IWF's 420 FQDN. In some implementations, AMF 430 saves N3IWF's 420 FQDN (step 404 of FIG. 4) in a data store (e.g., the repository 250 in FIG. 2). The IE includes the FQDN of N3IWF 420 collocated with UPFs. Having saved the FQDN of N3IWF 420, AMF 430 sends a NG SETUP RESPONSE message to N3IWF 420 (step 406 of FIG. 4).

In some implementations, after receiving the NG SETUP RESPONSE message, UE 410 registers to a 5G core network via N3IWF 420, AMF 430, and AUSF 440 (step 408 of FIG. 4). AUSF 440 stores data for authentication of UE 410. UE 410 further sends a PDU session establishment request to N3IWF 420 (step 410 of FIG. 4). In some implementations, the PDU session establishment request is encrypted and sent via an untrusted non-3GPP AN (e.g., non-3GPP AN 212 in FIG. 2). In some implementations, upon receiving the PDU session establishment request, N3IWF 420 forwards the PDU session establishment request to AMF (step 414 of FIG. 4). In some implementations, N3IWF 420 decrypts the PDU session establishment request prior to forwarding the request. AMF 430 then selects SMF 450 (step 416 of FIG. 4) and sends the FQDN of N3IWF 420 over N11 to SMF 450 (step 418 of FIG. 4). In some implementations, step 418 is performed during the PDN Connection establishment procedure, when AMF 430 sends a Nsmf_PDUSession_CreateSMContext Request towards SMF 450 on N11 interface. In addition, in some implementations, the FQDN of N3IWF 420 received in step 402 of FIG. 4 is included in JavaScript Object Notation (JSON) payload of the Nsmf_PDUSession_CreateSMContext Request sent by AMF 430.

In some implementations, upon receiving the Nsmf_PDUSession_CreateSMContext Request, SMF 450 stores the FQDN of N3IWF 420 in a data store, e.g., the repository 260 in FIG. 2 (step 422 of FIG. 4). In some implementations, SMF 450 communicates with UDM 460 (step 424 of FIG. 4), sends a Nsmf_PDUSession_CreateSMContext Response (step 426 of FIG. 4), and communicates with PCF 470 (step 428 of FIG. 4). In step 424 of FIG. 4, SMF 450 sends information to UDM 460 for UDM registration and subscription, where upon receiving the information, UDM 460 stores subscription data of UE 410. In step 428 of FIG. 4, SMF 450 sends information to PCF 470 for session management (SM) policy establishment. PCF determines policies about mobility and session management to make AMF and SMF operate properly.

In some implementations, SMF 450 selects the UPF based on criteria specified in 3GPP specification. In addition, in some implementations, as explained above with reference to FIGS. 2 and 3, SMF 450 performs topology matching using N3IWF FQDN received in step 418 of FIG. 4 (step 432 of FIG. 4). In some implementations, the topology match is performed based on a match of FQDNs of available UPFs and the FQDN of N3IWF. In some implementations, the FQDNs indicate the physical location and/or network topology distance (e.g., hops, delays) between the nodes. Thus, the topologically matched nodes are the closest.

In some implementations, once SMF 450 selects the collocated nodes, SMF 450 communicates with N3IWF 420 through N4 interface (step 434 of FIG. 4). In some implementations, other PDU session establish procedures as defined in 3GPP specification are performed to complete the PDU session establishment. Once the PDU session is established, UE 410 has access to the 5G network through the data path passing the collocated N3IWF 420 and the UPF(s).

Figure 5:
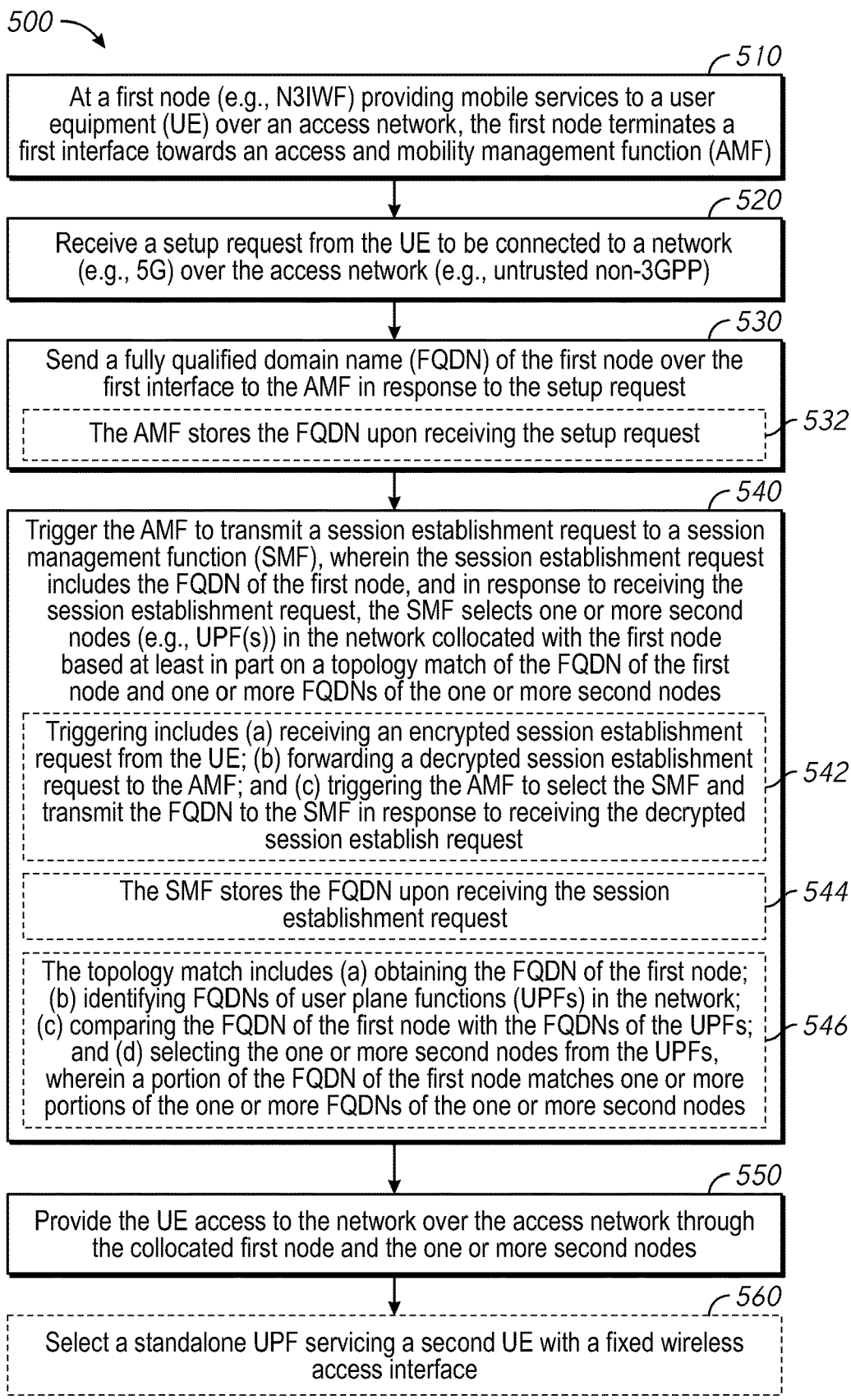
FIG. 5 is a flowchart illustrating a method of selecting collocated nodes in 5G network in accordance with some implementations.

FIG. 5 is a flowchart illustrating a method 500 of selecting collocated nodes in 5G network in accordance with some implementations. In some implementations, as represented by block 510, the method 500 is performed at a first node (e.g., N3IWF 218 in FIG. 2, N3IWF 310 in FIG. 3, or N3IWF 420 in FIG. 4) that provides mobile services to a UE over an access network (e.g., the untrusted non-3GPP AN 212 in FIG. 2). In some implementations, the first node terminates a first interface towards an AMF. For example, in FIG. 3, N3IWF 218 terminates the interface N2 towards AMF 214.

Beginning at block 520 of FIG. 5, the method 500 includes receiving a setup request from UE to be connected to a network (e.g., the 5G network 200 in FIG. 2) over the access network (e.g., the untrusted non-3GPP AN 212 in FIG. 2). The method 500 continues, as represented by block 530, with the first node sending a fully qualified domain name (FQDN) of the first node over the first interface to the AMF in response to the setup request. For example, in FIG. 2, N3IWF 218 sends N3IWF FQDN 240 over N2 interface to AMF 214. In some implementations, as shown in FIG. 4, during step 402, N3IWF 420 sends a NG SETUP REQUEST message to AMF 430, where the NG SETUP REQUEST message includes an IE representing N3IWF's 420 FQDN. In some implementations, as represented by block 532, the AMF stored the FQDN of the first node upon receiving the setup request. For example, in step 404 of FIG. 4, AMF 430 saves N3IWF's FQDN in a data store (e.g., the repository 250 in FIG. 2) after receiving the NG Setup Request with N3IWF's FQDN IE.

The method 500 continues, as represented by block 540, with the first node triggering the AMF to transmit a session establishment request to a session management function (SMF). In some implementations, the session establishment request includes the FQDN of the first node. Further, in response to receiving the session establishment request, the SMF selects one or more second nodes (e.g., UPF UL Classifier/Branching Point 226 and UPF Anchor Point 2 224-2 in FIG. 2) in the network collocated with the first node based at least in part on a topology match of the FQDN of the first node and one or more FQDNs of the one or more second nodes. For example, in step 418 of FIG. 4, after receiving the PDU session establishment request, AMF 430 sends the Nsmf_PDUSession_CreateSMContext Request towards SMF 450 on N11 interface. In step 432 of FIG. 4, after receiving the Nsmf_PDUSession_CreateSMContext Request, SMF 450 performs topology match using N3IWF FQDN received in step 418 of FIG. 4, e.g., based on a match of FQDNs of available UPFs and the FQDN of N3IWF as described above with reference to FIG. 3.

In some implementations, as represented by block 542, triggering the AMF to transmit the session establishment request to the SMF includes receiving an encrypted session establishment request from UE, forwarding a decrypted session establishment request to the AMF, and triggering the AMF to select the SMF and transmit the FQDN of the first node to the SMF in response to receiving the session establish request. For example, in FIG. 4, after UE 410 registers to 5G core network in step 408, UE 410 sends the encrypted PDU session establishment request, e.g., via the untrusted non-3GPP AN 212 in FIG. 2. In FIG. 4, N3IWF 420 decrypts the PDU session establishment request prior to forwarding the decrypted session establishment request to AMF 430. Upon receiving the decrypted session establishment request, AMF 430 selects SMF 450 (step 416 of FIG. 4) and sends the FQDN of N3IWF 420 over N11 to SMF 450 in the Nsmf_PDUSession_CreateSMContext Request. In some implementations, JSON payload of the Nsmf_PDUSession_CreateSMContext Request sent by AMF 430 includes the FQDN of N3IWF 420. As represented by block 544, in some implementations, the SMF stores the FQDN of the first node upon receiving the session establishment request, e.g., the Nsmf_PDUSession_CreateSMContext Request in FIG. 4.

In some implementations, as represented by block 546, the topology match of the FQDN of the first node and the one or more FQDNs of the one or more second nodes includes obtaining the FQDN of the first node, identifying FQDNs of user plane functions (UPFs) in the network, comparing the FQDN of the first node with the FQDNs of the UPFs, and selecting the one or more second nodes from the UPFs. A portion of the FQDN of the first node matches one or more portions of the one or more FQDNs of the one or more second nodes.

For instance, in FIG. 2, FQDN match module 270 obtains the stored FQDN of N3IWF from the repository 260 and performs the topology match. An example of topology match is shown in FIG. 3, where from the pool of UPF nodes 320-1, 320-2, and 320-3, the FQDN match module 270 of SMF 216 selects UPF 1 320-1 and UPF 2 320-2 as being collocated with N3IWF 310. The topology matching, for instance, includes matching a portion of the FQDN of N3IWF corresponding to subdomain "sj.west.usa.com" and a portion of the FQDN of UPF 1 320-1 corresponding to subdomain "sj.west.usa.com" in order to select UPF 1 320-1; and matching a portion of the FQDN of N3IWF corresponding to "sj.west.usa.com" and a portion of the FQDN of UPF 2 320-2 corresponding to "sj.west.usa.com" in order to select UPF 2 320-2 as being collocated with N3IWF 310.

Referring back to FIG. 5, as represented by block 550, the method 500 continues with the first node providing UE access to the network over the access network through the collocated first node and the one or more second nodes. For instance, in FIG. 4, once the PDU session is established, UE 410 has access to the 5G network through the data path including the collocated N3IWF 420 and the UPF(s).

In some implementations, as represented by block 560, the method 500 further includes receiving a second setup request from a second UE to be connected to the network over the access network, where the second UE has a fixed wireless access interface. In such implementations, the first node triggers the AMF to transmit a fixed wireless access UE session establishment request to the SMF, wherein the SMF selects a standalone UPF from a pool of UPFs servicing the second UE.

Figure 6:
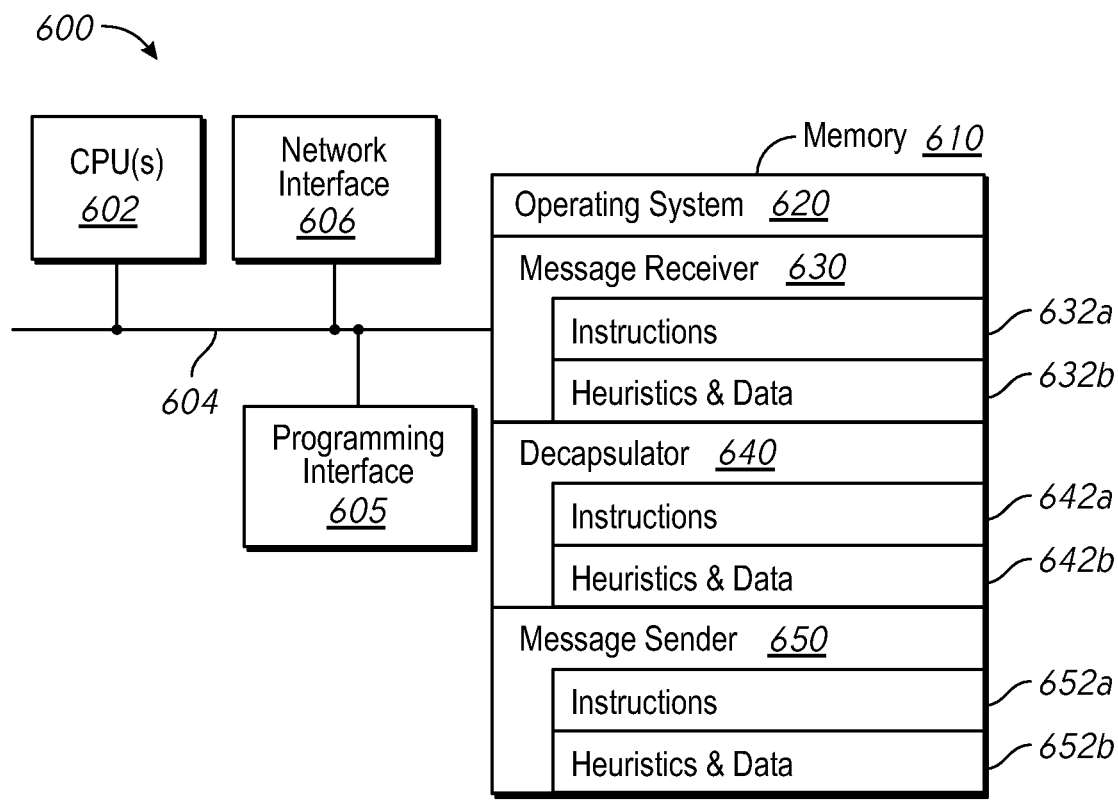
FIG. 6 is a block diagram of a networking device in accordance with some implementations.

FIG. 6 is a block diagram of a networking device 600 in accordance with some implementations. In some implementations, the networking device 600 corresponds to a N3IWF node in a 5G network, such as N3IWF 218 in FIG. 2, N3IWF 310 in FIG. 3, or N3IWF 420 in FIG. 4, and performs one or more of the functionalities described above. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations, the networking device 600 includes one or more processing units (CPU's) 602 (e.g., processors), one or more network interfaces 606, a memory 610, a programming interface 605, and one or more communication buses 604 for interconnecting these and various other components.

In some implementations, the communication buses 604 include circuitry that interconnects and controls communications between system components. The memory 610 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium. Moreover, in some implementations, the memory 610 or the non-transitory computer readable storage medium of the memory 610 stores the following programs, modules and data structures, or a subset thereof including an optional operating system 620, a message receiver 630, a decapsulator 640, and a message sender 650. In some implementations, one or more instructions are included in a combination of logic and non-transitory memory. The operating system 620 includes procedures for handling various basic system services and for performing hardware dependent tasks.

In some implementations, the message receiver 630 is configured to receive a message (e.g., receiving the encrypted PDU session establishment request message 412 in step 412 of FIG. 4, receiving the NG Setup Response in step 406 of FIG. 4, or exchanging session establishment messages with SMF 450 over N4 in step 434 of FIG. 4) over the network interface 606 (e.g., a non-3GPP interface). To that end, the message receiver 630 includes a set of instructions 632a and heuristics and data 632b.

In some implementations, the decapsulator 640 is configured to decapsulate the encapsulated message in preparation for forwarding the decapsulated message to another node in the network (e.g., decapsulating PDU session establishment request at N3IWF 420 before forwarding to AMF 430 in FIG. 4). To that end, the decapsulator 640 includes a set of instructions 642a and heuristics and data 642b.

In some implementations, the message sender 650 is configured to transmit a message to another node in the network (e.g., transmitting the NG Setup Request with N3IWF FQDN IE in step 402 of FIG. 4, transmitting the decrypted PDU session establishment request to AMF 430 in step 414 of FIG. 4, or exchanging session establishment messages with SMF 450 over N4 in step 434 of FIG. 4). To that end, the message sender 650 includes a set of instructions 652a and heuristics and data 652b.

Although the message receiver 630, decapsulator 640, and message sender 650 are illustrated as residing on a single networking device 600, it should be understood that in other embodiments, any combination of the message receiver 630, decapsulator 640, and message sender 650 are illustrated as residing on a single networking device 600 can reside in separate computing devices in various implementations. For example, in some implementations, each of the message receiver 630, decapsulator 640, and message sender 650 illustrated as residing on a single networking device 600 resides on a separate computing device.

Moreover, FIG. 6 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 7:
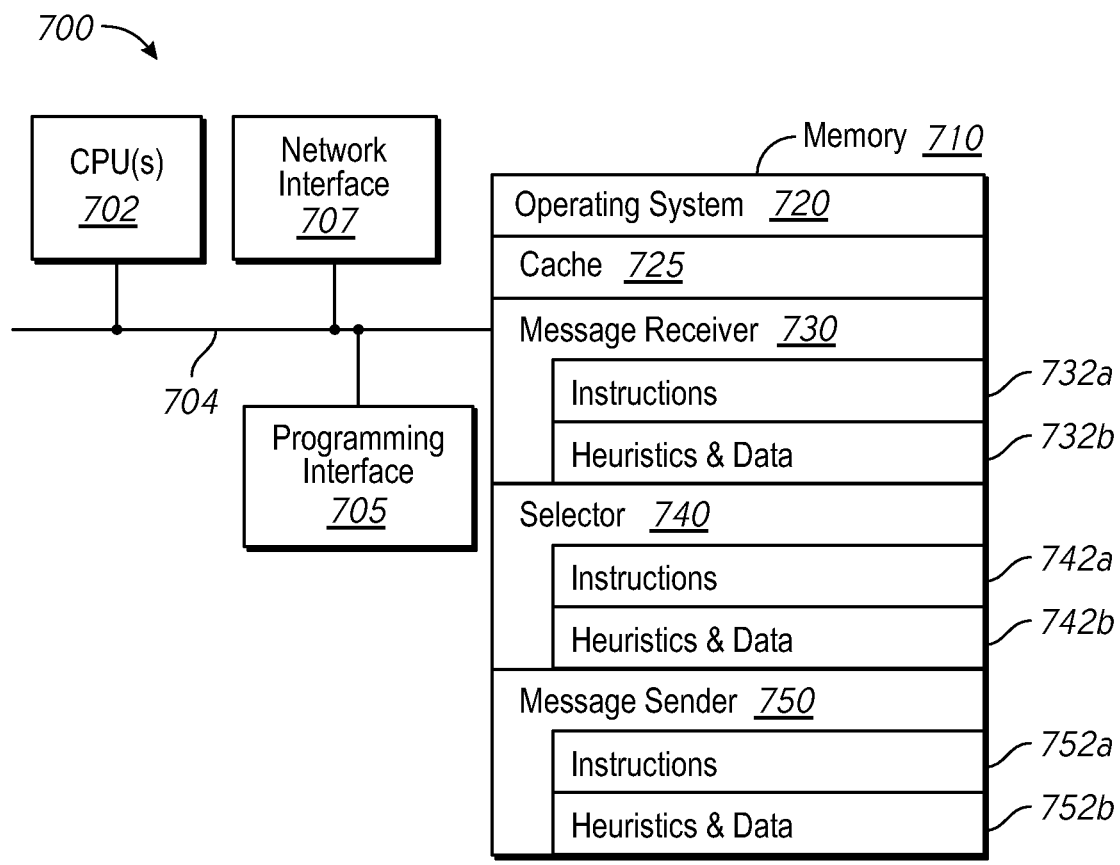
FIG. 7 is a block diagram of another networking device in accordance with some implementations.

FIG. 7 is a block diagram of a networking device 700 in accordance with some implementations. In some implementations, the networking device 700 corresponds to a SMF node in a 5G network, such as SMF 216 in FIG. 2 or SMF 450 in FIG. 4, and performs one or more of the functionalities described above with respect to a networking device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the networking device 700 includes one or more processing units (CPU's) 702 (e.g., processors), one or more network interfaces 707, a memory 710, a programming interface 705, and one or more communication buses 704 for interconnecting these and various other components.

In some implementations, the communication buses 704 include circuitry that interconnects and controls communications between system components. The memory 710 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. Moreover, in some implementations, the memory 710 or the non-transitory computer readable storage medium of the memory 710 stores the following programs, modules and data structures, or a subset thereof including an optional operating system 720, a cache 725 (e.g., the data store 260 for storing the FQDN of N3IWF in FIG. 2), a message receiver 730, a selector 740, and a message sender 750. In some implementations, one or more instructions are included in a combination of logic and non-transitory memory. The operating system 720 includes procedures for handling various basic system services and for performing hardware dependent tasks.

In some implementations, the message receiver 730 is configured to receive a message over the network interface 707, e.g., receiving the Nsmf_PDUSession_CreateSMContext Request message from AMF 430 via N11 interface in step 418 of FIG. 4 or exchanging session establishment messages with SMF 450 over N4 in step 434 of FIG. 4. To that end, the message receiver 730 includes a set of instructions 732a and heuristics and data 732b.

In some implementations, the selector 740 is configured to select one or more UPFs servicing the session. In some implementations, the selector 740 selects one or more UPFs based on criteria specified in 3GPP specification and additionally based on topology match (e.g., using the FQDN match 270 module to select collocated UPFs 226 and 224-2 as shown in FIG. 2). To that end, the selector 740 includes a set of instructions 742a and heuristics and data 742b.

In some implementations, the message sender 750 is configured to transmit messages over the network interface 707, e.g., exchanging UDM registration and subscription messages to UPD 460 over N10 interface in step 424 of FIG. 4, transmitting Nsmf_PDUSession_CreateSMContext Response message to AMF 430 over N11 interface in step 426 of FIG. 4, exchanging session establishment messages with SMF 450 over N4 in step 434 of FIG. 4, or exchanging SM Policy Establishment messages with PCF 470 over N7 interface in step 428 of FIG. 4. To that end, the message sender 750 includes a set of instructions 752a and heuristics and data 752b.

Although the cache 725, message receiver 730, selector 740, and message sender 750 are illustrated as residing on a single networking device 700, it should be understood that in other embodiments, any combination of the cache 725, message receiver 730, selector 740, and message sender 750 are illustrated as residing on a single networking device 700 can reside in separate computing devices in various implementations. For example, in some implementations, each of the cache 725, message receiver 730, selector 740, and message sender 750 are illustrated as residing on a single networking device 700 resides on a separate computing device.

Moreover, FIG. 7 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Note that the components and techniques shown and described in relation to the separate figures can indeed be provided as separate components and techniques, and alternatively one or more (or all of) the components and techniques shown and described in relation to the separate figures are provided together for operation in a cooperative manner.

While various aspects of embodiments within the scope of the appended claims are described above, it should be apparent that the various features of embodiments described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first spine switch could be termed a second spine switch, and, similarly, a second spine switch could be termed a first spine switch, which changing the meaning of the description, so long as all occurrences of the "first spine switch" are renamed consistently and all occurrences of the second spine switch are renamed consistently. The first spine switch and the second spine switch are both spine switches, but they are not the same spine switch.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The invention claimed is:

1. A method comprising:
    at a first node providing mobile services to a user equipment (UE) over an access network, wherein the first node terminates a first interface towards an access and mobility management function (AMF):
    receiving a setup request from the UE to be connected to a network over the access network;
    sending a fully qualified domain name (FQDN) of the first node over the first interface to the AMF in response to the setup request;
    triggering the AMF to transmit a session establishment request to a session management function (SMF), wherein the session establishment request includes the FQDN of the first node, and in response to receiving the session establishment request, the SMF selects one or more second nodes in the network collocated with the first node based at least in part on a topology match of the FQDN of the first node and one or more FQDNs of the one or more second nodes; and
    providing UE access to the network over the access network through the collocated first node and the one or more second nodes.

2. The method of claim 1, wherein the first node is a N3 InterWorking Function (N3IWF).

3. The method of claim 1, wherein the network is a 5G network.

4. The method of claim 1, wherein the access network is an untrusted non-3GPP access network.

5. The method of claim 1, wherein the AMF stores the FQDN of the first node upon receiving the setup request.

6. The method of claim 1, wherein a second node of the one or more second nodes is a User Plane Function (UPF) that terminates a second interface towards the SMF.

7. The method of claim 1, wherein triggering the AMF to transmit the session establishment request to the SMF includes:
    receiving an encrypted session establishment request from UE;
    forwarding a decrypted session establishment request to the AMF; and
    triggering the AMF to select the SMF and transmit the FQDN of the first node to the SMF in response to receiving the decrypted session establishment request.

8. The method of claim 1, wherein the SMF stores the FQDN of the first node upon receiving the session establishment request.

9. The method of claim 1, wherein the topology match of the FQDN of the first node and the one or more FQDNs of the one or more second nodes includes:
    obtaining the FQDN of the first node;
    identifying FQDNs of user plane functions (UPFs) in the network;
    comparing the FQDN of the first node with the FQDNs of the UPFs; and
    selecting the one or more second nodes from the UPFs, wherein a portion of the FQDN of the first node matches one or more portions of the one or more FQDNs of the one or more second nodes.

10. The method of claim 1, further comprising:
    receiving a second setup request from a second UE to be connected to the network over the access network, wherein the second UE has a fixed wireless access interface; and
    triggering the AMF to transmit a fixed wireless access UE session establishment request to the SMF, wherein the SMF selects a standalone UPF from a pool of UPFs servicing the second UE.

11. A first node comprising:
    one or more processors;
    a non-transitory memory coupled to the one or more processors;
    a plurality of network interfaces including a network interface terminating a first interface towards an access and mobility management function (AMF); and
    one or more programs stored in the non-transitory memory, which, when executed by the one or more processors, cause the first node to:
    receive a setup request from a user equipment (UE) to be connected to a network over an access network;
    send a fully qualified domain name (FQDN) of the first node over the first interface to the AMF in response to the setup request;
    trigger the AMF to transmit a session establishment request to a session management function (SMF), wherein the session establishment request includes the FQDN of the first node, and in response to receiving the session establishment request, the SMF selects one or more second nodes in the network collocated with the first node based at least in part on a topology match of the FQDN of the first node and one or more FQDNs of the one or more second nodes; and provide UE access to the network over the access network through the collocated first node and the one or more second nodes.

12. The device of claim 11, wherein the first node is a N3 InterWorking Function (N3IWF).

13. The first node of claim 11, wherein the network is a 5G network.

14. The first node of claim 11, wherein the access network is an untrusted non-3GPP access network.

15. The first node of claim 11, wherein the AMF stores the FQDN of the first node upon receiving the setup request.

16. The first node of claim 11, wherein a second node of the one or more second nodes is a User Plane Function (UPF) that terminates a second interface that is an N4 interface towards the SMF.

17. The first node of claim 11, wherein triggering the AMF to transmit the session establishment request to the SMF includes:
    receiving an encrypted session establishment request from UE;
    forwarding a decrypted session establishment request to the AMF; and
    triggering the AMF to select the SMF and transmit the FQDN of the first node to the SMF in response to receiving the decrypted session establishment request.

18. The first node of claim 11, wherein the SMF stores the FQDN of the first node upon receiving the session establishment request.

19. The first node of claim 11, wherein the topology match of the FQDN of the first node and the one or more FQDNs of the one or more second nodes includes:
    obtaining the FQDN of the first node;
    identifying FQDNs of user plane functions (UPFs) in the network;
    comparing the FQDN of the first node with the FQDNs of the UPFs; and
    selecting the one or more second nodes from the UPFs, wherein a portion of the FQDN of the first node matches one or more portions of the one or more FQDNs of the one or more second nodes.

20. The first node of claim 11, wherein the one or more programs further cause the first node to:
    receive a second setup request from a second UE to be connected to the network over the access network, wherein the second UE has a fixed wireless access interface; and
    trigger the AMF to transmit a fixed wireless access UE session establishment request to the SMF, wherein the SMF selects a standalone UPF from a pool of UPFs servicing the second UE.

* * * * *